United States Patent [19]

Masheff

[11] Patent Number: 4,876,549
[45] Date of Patent: Oct. 24, 1989

[54] DISCRETE FOURIER TRANSFORM DIRECTION FINDING APPARATUS

[75] Inventor: Michael S. Masheff, St. Petersburg, Fla.

[73] Assignee: E-Systems, Inc., Dallas, Tex.

[21] Appl. No.: 165,003

[22] Filed: Mar. 7, 1988

[51] Int. Cl.$^4$ .......................... G01S 5/02; G01S 13/00
[52] U.S. Cl. .................................... 342/417; 342/194; 342/195
[58] Field of Search ............................... 342/194–196, 342/417, 432, 444

[56] References Cited

U.S. PATENT DOCUMENTS

| | | |
|---|---|---|
| H922 | 6/1987 | Klose et al. .......................... 342/394 |
| 3,449,748 | 6/1969 | Thyssens . |
| 3,500,414 | 3/1970 | Woerrlein . |
| 3,540,053 | 11/1970 | Sparagna et al. . |
| 4,034,376 | 7/1977 | Barton . |
| 4,170,774 | 10/1979 | Schaefer . |
| 4,443,801 | 4/1984 | Klose et al. . |
| 4,486,757 | 12/1984 | Ghose et al. . |
| 4,532,515 | 7/1085 | Cantrell et al. . |

Primary Examiner—Thomas H. Tarcza
Assistant Examiner—Gregory C. Issing
Attorney, Agent, or Firm—Albert M. Crowder, Jr.

[57] ABSTRACT

A discrete fourier transform direction finding apparatus for performing a direction finding function on signals received through two antennae separated by a known distance. The outputs of the respective antennae are connected to first and second receiver channels which convert the received signals down to baseband and provide orthogonal I and Q channel outputs. A common local oscillator is used to maintain phase coherency between the channels and AGC signals are provided to maintain identical delays in the receiver RF paths. The processed signals from each receiver channel are than fed into a respective charge coupled device Chirp-Z transform (discrete fourier transform) circuit to produce real and imaginary components of the received signals. These signals are then converted to digital form and are used by subsequent circuitry to determine the angle of arrival of the received signal.

8 Claims, 2 Drawing Sheets

DISCRETE FOURIER TRANSFORM DIRECTION FINDING APPARATUS

TECHNICAL FIELD

The present invention relates to a direction finding apparatus in general and in particular relates to a discrete fourier transform direction finding apparatus for performing a direction finding function on signals received through two antennae separated by some known distance.

BACKGROUND OF THE INVENTION

Direction finding becomes a more difficult task giving the general use of more exotic communications systems utilizing spread spectrum, monopulse, packet, or other jam-resistant techniques In the past, some of the techniques for direction finding have included the use of multiplexed antennae coupled to a single receiver to obtain a phase comparison to determine the direction of arrival of the signal. Other techniques for direction finding have included the use of directional antennae with a phase comparison performed at the output of two receivers which are calibrated together. This technique has various disadvantages including erroneous direction of arrival measurements due to modulation rates or system errors because of lack of calibration. Common disadvantages are that they are slow, and have difficulty in determining the angle of arrival of spread spectrum signals and monopulse or packetized signals.

Recently, the use of a Chirp-Z Transform Discrete Fourier Transform has allowed direction finding of multiple frequencies simultaneously over wide bandwidths. The use of a Chirp-Z Transform with Direction Finding Apparatus has been disclosed in U.S. Pat. No. 4,443,801. As set forth in that patent, signals of interest are received, heterodyned, and then mixed with the sweeping chirp local oscillator. Mixed signals are coupled to two Chirp-Z transformer channels The outputs of the two Chirp-Z transformer channels are fed to a phase comparator circuit that resolves the relative phase shift between the signals from each of the channels The frequency of the input signals is derived from the time ordering of the energy spikes, these spikes being the physical representation of the transformed coefficients, present at the output of the Chirp-Z channels prior to phase detection. The angle of arrival of a signal of given frequency is determined by sampling of the phase comparator outputs followed by a simple calculation performed by a microprocessor. The input receivers in this patent process the RF input signals and generate IF output signals. The signals are then mixed with a known frequency to obtain a difference frequency in each channel separated by a known frequency. The signals in each channel are then amplified and applied to a surface acoustic wave dispersive delay line. The resultant output signal is a pair of very narrow pulses, the width of which is inversely proportional to the bandwidth of the dispersive delay line. Thus the output signal from the surface acoustic wave dispersive delay line is a pair of RF pulses of different nominal center frequency separated in the time domain as distinguished from the input signal into the delay line which comprised two spread spectrum systems, overlapping in frequency but coincident in time. This type of signal transformation is called a Chirp Transform which is well known in the art.

There are several problems with this type of prior art direction finding apparatus. In the first place, a local oscillator is used to down convert each input RF signal to an IF signal which is injected into the dispersive delay line. It is well known that SAW devices change operational characteristics as a function of temperature, as well as age, and they must be recalibrated periodically. The dispersive delay line devices of the prior art utilize both RF and IF circuits, both of which are temperature sensitive. Also, such circuits can cause amplitude modulation to be converted t phase modulation. The SAW devices compare the phase of the received signals. The angle or phase between the two channels is directly related to the difference in time of arrival of the signal at the two antennae. That time is very small, in the order of 10 ns for a 10' separation of the antenna. The length of the SAW delay line may be 20 $\mu$s or 20,000 ns. Thus, very precise control of the signal phase in each channel is required in order not to lose the 10 ns phase difference out of the 20,000 ns delay in the SAW delay line. This is the reason the system is so temperature sensitive because a small change in temperature can distort the output. In addition, the dispersive delay lines have a fixed delay and thus the frequency resolution of the device cannot be adjusted.

The present invention overcomes the disadvantages of the prior art by including receivers for down converting the incoming RF signals to baseband thereby avoiding any further temperature considerations in the remainder of the circuit. It is only in the RF receiver portion that temperature sensitivity will have any effect and that is a small effect. Secondly, the delay line of the present device is formed with a charge coupled device (CCD) which receives the baseband orthogonal I and Q signals. The charge coupled device enables the use of a clock frequency common to the two channels to control the amount of delay. Thus, the charge coupled device becomes a variable delay line whose delay or length depends upon the clock frequency setting the sampling rate. The faster the sampling rate, the higher the resolution. Thus, the Chirp-Z transform implemented with a charge coupled device delay line technology using variable sampling rates and baseband signals for processing by the delay line overcomes the problems of the prior art.

The present invention provides a direction finding apparatus in which the receivers coupled to the separated antennae reduce the incoming RF signals to baseband signals for processing by the Chirp-Z Transform Discrete Fourier Transform circuit.

The present invention also provides a direction finding apparatus which utilizes a charge coupled device as a variable length delay line associated with the Chirp-Z transform.

The present invention still further provides a direction finding apparatus in which a control circuit provides a variable sampling rate to the charge coupled device delay line to allow the adjustment of the frequency resolution of the charge coupled device Chirp-Z transform apparatus.

SUMMARY OF THE INVENTION

Thus the present invention relates to a circuit for finding the direction of a transmitted RF signal received on two antennae separated by a known distance comprising an RF signal receiver coupled to each antenna for receiving corresponding antenna signals and providing orthogonal I and Q baseband signal outputs, a delay line circuit coupled to each receiver for receiving, sampling and separating the I and Q baseband signals into components by frequency and amplitude, a control circuit coupled to the delay line circuit for varying the sampling rate at which the I and Q signal components are generated and means coupled to the delay line circuit for utilizing the sampled and separated baseband I and Q signal components to obtain the direction in which the transmitted signal was propagated.

The invention also relates to a method of finding the direction of a transmitted RF signal received on two antennae separated by a known distance comprising the steps of coupling an RF receiver to each antenna for receiving the corresponding antenna signals and providing orthogonal I and Q baseband signal outputs, sampling and separating the I and Q baseband signals into components by frequency and amplitude using a delay line circuit, varying the sampling rate at which the delay line circuit generates the separated I and Q signal components, and calculating the direction in which the transmitted signal was propagated utilizing the sampled and separated baseband I and Q signal components.

BRIEF DESCRIPTION OF THE DRAWINGS

A more complete understanding of the present invention will be had from the following specification and claims taken in conjunction with the accompanying drawings in which:

DETAILED DESCRIPTION OF THE DRAWINGS

Figure 1:
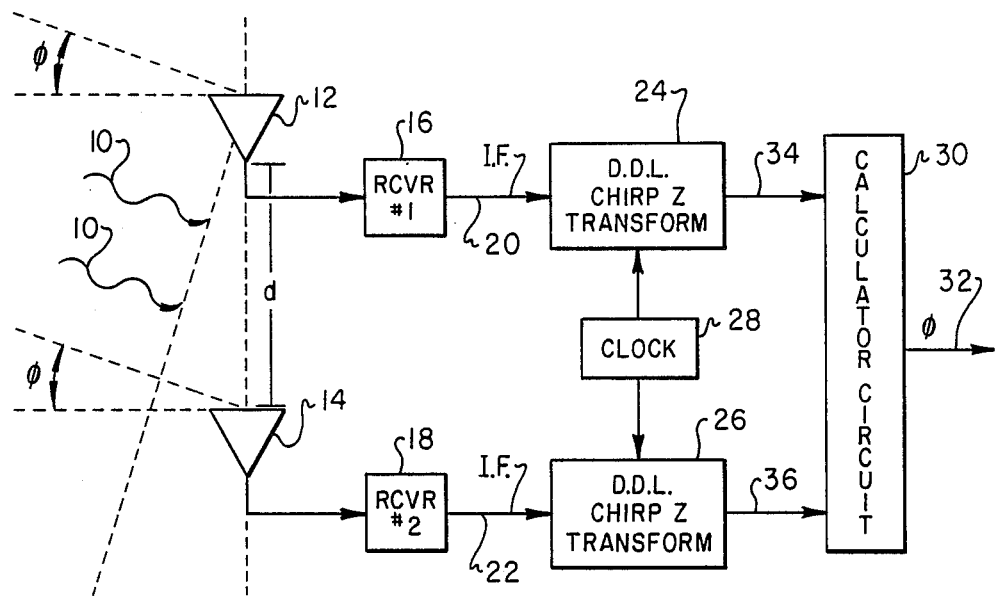
FIG. 1 is a schematic diagram of a prior art direction finding system using surface acoustic wave dispersive delay lines in conjunction with the Chirp-Z transform.

FIG. 1 is a schematic diagram of a prior art direction finding apparatus such as that disclosed in U.S. Pat. No. 4,443,801 which uses a SAW dispersive delay line in each channel to process IF signals. The incoming signals represented by wavy lines 10 are at an angle $\phi$ with respect to the two antennae 12 and 14. The two antennae 12 and 14 are separated by some known distance, d, and couple the received RF signals to corresponding receivers 16 and 18. These receivers 16 and 18 may be of any of several types well known in the prior art capable of reducing a received radio frequency signal to an intermediate frequency. This frequency reduction is accomplished by the usual heterodyning techniques so long as the phase relationship among the received signals is maintained. The IF output signals from receivers 16 and 18 on respective output lines 20 and 22 are coupled to respective SAW dispersive delay lines 24 and 26 which are used so as to form a Chirp-Z transform. Thus, when the IF signal is introduced into the acoustic wave dispersive delay line 24 and 26 having the proper slope, the resulting output signal is a pair of very narrow pulses, the widths of which are inversely proportional to the bandwidth of the dispersive delay line and which are separated in the time domain by a readily calculable amount. The intrapulse spacing in the pulse train generated by the dispersive delay lines 24 and 26 represents the closeness in the frequency spectrum of the frequencies to be examined since the Chirp transform separates the various input signals of different frequency in the time domain. The length of the pulse train determines the width of the passband to be examined. It is well known, of course, that the passband is also limited by the bandwidth of the dispersive delay lines. A clock circuit 28 provides the necessary frequencies which are used in mixers to reduce received signals to lower frequency signals and which are also used as clocking pulses in other circuits. The output signals from dispersive delay lines 24 and 26 on lines 34 and 36 respectively are coupled to a calculator circuit 30 which utilizes those signals to calculate the angle $\phi$ of the incoming wave front to the antennae 12 and 14.

This circuit has a number of disadvantages. The first is that the receivers 16 and 18 reduce the incoming RF frequency to an IF frequency which is applied to the dispersive delay lines 24 and 26. It is well known that RF and IF circuits are temperature sensitive and cause distortion in their output based upon temperature changes. Such distortion is extremely critical in direction finding apparatus since the angle o phase of the received signals at the separated antennae is directly related to the difference in time of arrival of the signal at the two antennae. It is also well known that that time is very small, in the order of 10 ns, for a 10' separation of the antenna. Thus, the phase difference of the signals in the two channels must be carefully controlled. By reducing the received RF signal only to the IF signal for injection into the dispersive delay lines 24 and 26, the system is again subject to further distortion due to temperature changes. It is well known in the art that surface acoustic wave delay lines are temperature sensitive and the mixers and other circuits associated with the delay lines are also temperature sensitive thus creating additional unwanted phase shift between the two channels simply because of temperature changes. Further, the delay lines operate at a fixed sampling rate and thus the resolution of the delay line cannot be adjusted.

Figure 2:
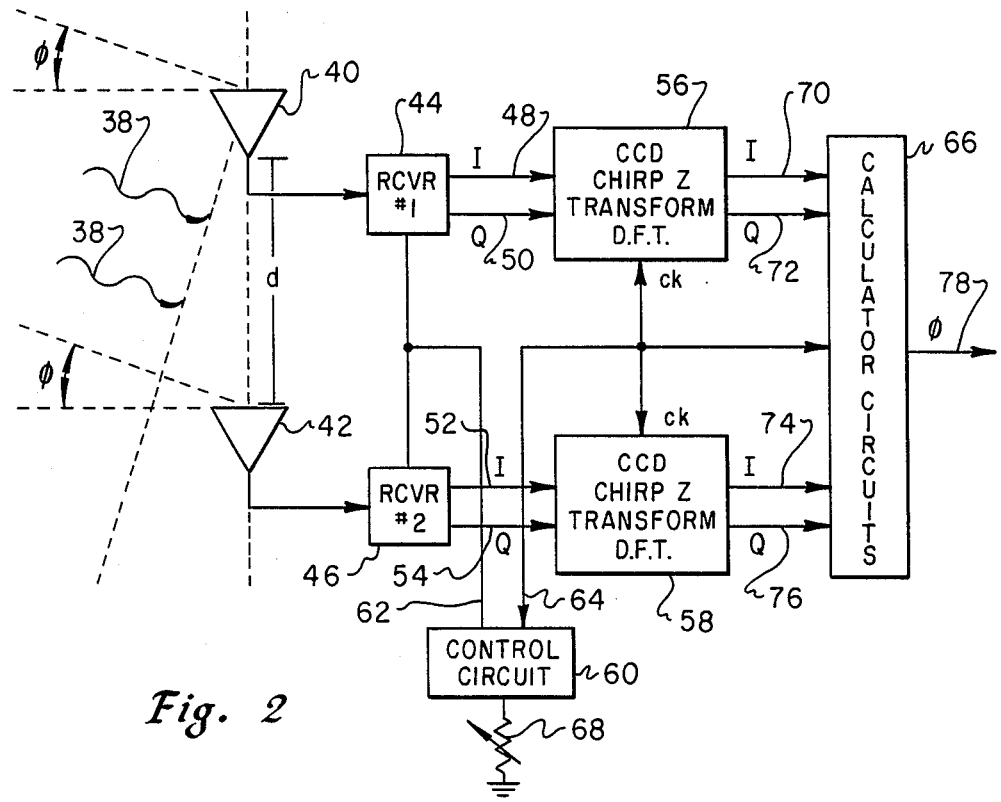
FIG. 2 is a schematic diagram of the direction finding apparatus of the present invention which uses a charge coupled device variable length delay line in conjunction with the Chirp-Z transform and wherein the two input receivers down convert the incoming RF signals to baseband signals.

The circuit disclosed in FIG. 2 overcomes the disadvantages of the prior art. Again, in FIG. 2, the wave front designated by the wavy arrows 38 approach the spaced antennae 40 and 42 at some angle $\phi$. The antennae 40 and 42 are separated by some known distance, d. The RF signals are coupled into receivers 44 and 46 where the signals are down converted to baseband (zero IF) orthogonal I and Q signal outputs on lines 48 and 50 from receiver 44 and lines 52 and 54 from receiver 46. Thus, with baseband signals being applied to the remainder of the circuits, no further distortion occurs in the circuit because of temperature change since the circuit for processing the baseband signals are not temperature sensitive. In addition, the Chirp-Z transform is performed in conjunction with a charge coupled device (CCD) which forms the delay line. The Chirp-Z transform functions in a manner well known in the prior art to generate signals which can be used to calculate the incoming wave front angle or direction as will be described more fully hereafter.

The use of the CCD with the Chirp-Z transform functions offers several advantages over the prior art. First, the charge coupled device is not as temperature sensitive as a surface acoustic wave dispersive delay line. Secondly, the charge coupled device can be sampled at a variable rate to control the delay and hence a variable sampling rate can be used which allows the adjustment of the frequency resolution of the charge coupled device Chirp-Z transform. The slower the sampling rate, the higher the resolution obtained. A control circuit 60 includes the necessary clock circuitry to provide clock pulses on lines 62 to the receivers 44 and 46 and receives signals from the Chirp-Z transform circuitry to obtain the frequency of the incoming signal and also generates clock signals on line 64 to both the charge coupled device Chirp-Z transform circuits 56 and 58 as well as to the calculator circuit 66. Any well known means such as a variable resistor 68 may be utilized by control circuit 60 to vary the sampling rate of the charge coupled devices.

The outputs of the charge coupled device circuits 56 and 58 are orthogonal I and Q signals on lines 70 and 72 from CCD 56 and lines 74 and 76 from CCD device 58. Calculator circuits 66 utilize these signals to calculate the incoming wave angle $\phi$ on line 78.

Thus, the circuit as shown generally in FIG. 2 calculates a Discrete Fourier Transform from signals received in real time and produces outputs that are the real and imaginary coefficients of the fourier transform. The bandwidth and resolution of the circuit may be varied by changing the clock rate or the sampling rate from control circuit 60.

Figure 3:
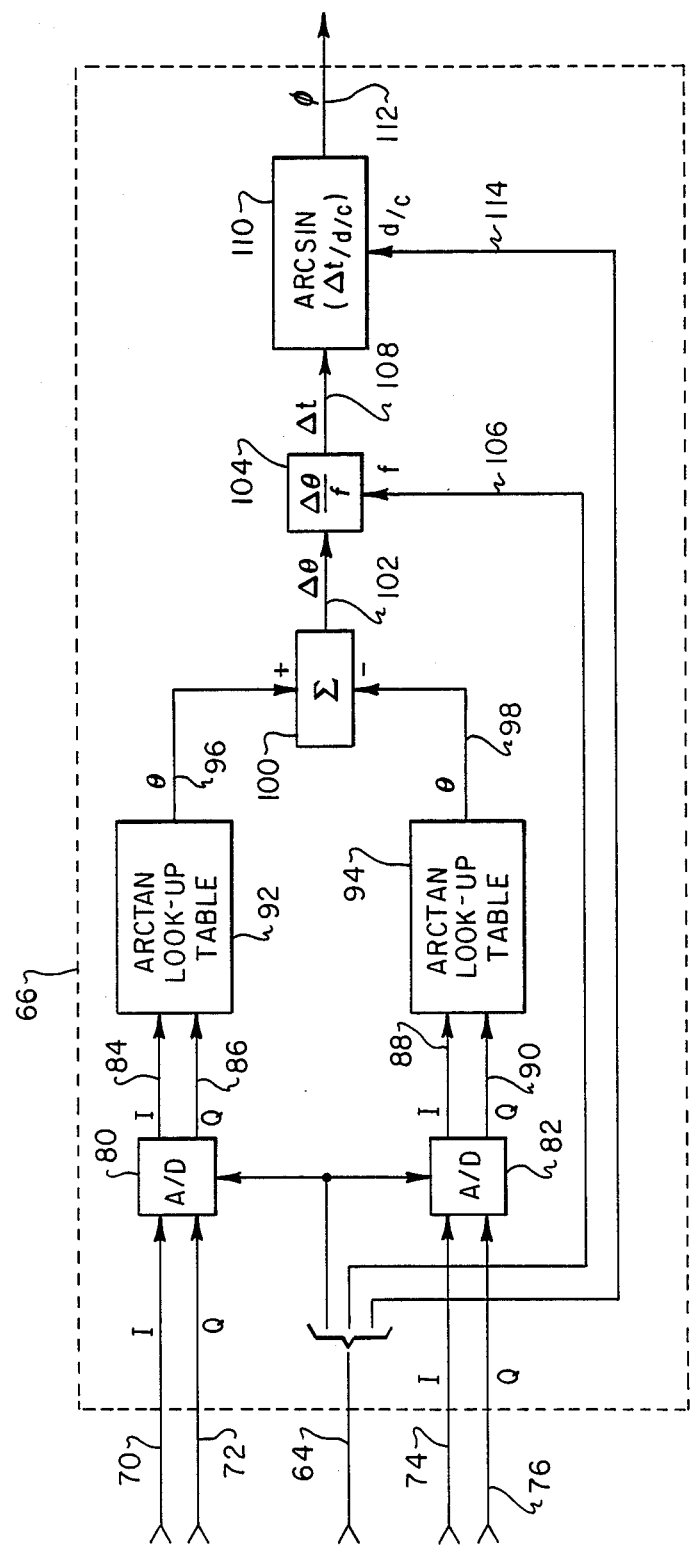
FIG. 3 is a schematic diagram of the calculator circuits shown in FIG. 2.

The details of the calculator circuit 66 are shown in FIG. 3. Such circuitry is old and well known and does not add any new or unusual results to the present invention. The incoming signals from one channel on lines 70 and 72 are coupled to an analog-to-digital converter 80 while the incoming signals from the other channel on lines 74 and 76 are coupled to an analog-to-digital converter 82. These A/D converters 80 and 82 generate orthogonal I and Q digital output signals on lines 84 and 86 and 88 and 90 respectively. The signals on these lines are used to address arctangent lookup tables 92 and 94 to calculate phase angles $\theta$. These angles on lines 96 and 98 are coupled to a summing unit 100 which produces a difference signal, or $\Delta\theta$, on line 102. This signal represents the difference in the phase of the signals arriving at the two antennae. This difference is divided by the frequency of interest, f, in the divider 104. The data representing the frequency, f, is provided on line 106 from control circuit 60 which obtains that information from the Chirp-Z transform calculations as is well known in the art. The output of the divider circuit 104 on line 108 represents the difference in time, $\Delta t$, of the signals arriving at the two antennae 40 and 42. By dividing the difference in time, $\Delta t$, by the quantity d/c which represents the separation distance of the antennae, d, divided by the velocity of light, c, and taking the arcsin of the result in a circuit represented by block 110, the wave direction $\phi$ is obtained on line 112. Again, the data representing the distance of the antennae separation, d, divided by the velocity of light, c, is provided on line 114 from control unit 60 in a well known manner.

Thus, there has been disclosed a discrete fourier transform direction finding apparatus which performs a direction finding function on signals received from two antennae separated by a known distance. The outputs of the respective antennae are connected to first and second receivers which convert the received signals down to baseband and provide orthogonal I and Q channel outputs. A clock circuit, such as a common local oscillator, is used to maintain phase coherency between the channels and AGC signals are provided to maintain identical delays in the receiver RF paths. The processed signals are then each fed into a charge coupled device Chirp-Z transform (discrete fourier transform) circuit to produce real and imaginary components of the received signals. These signals are then converted to digital form and used as inputs to arctangent lookup tables to generate a phase angle signal for each channel. The phase difference between the two channels is then calculated and converted to a corresponding time of arrival difference. An arcsin calculation is then performed to determine the angle of arrival of the received signal.

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as defined in the appended claims.

I claim:

1. A circuit for finding the direction of an RF signal received on two antennae separated by a known distance "d" comprising:
   an RF signal receiver coupled to each antenna for receiving the antenna signals and generating orthogonal I and Q baseband signal outputs
   a CCD Chirp-Z Discrete Fourier transform circuit coupled to each receiver for receiving, sampling and separating said I and Q baseband signals into components by frequency and amplitude,
   a control circuit coupled to said CCD Chirp-Z Discrete Fourier transform circuit for controlling the sampling rate at which the I and Q signal components are sampled and separated to adjust frequency resolution, and
   means coupled to the CCD Chirp-Z Discrete Fourier transform circuit for utilizing the sampled and separated baseband I and Q signal components to obtain the direction of propagation of the RF signal.

2. A circuit as in claim 1 wherein said control circuit for controlling the sampling rate of the CCD Chirp-Z Discrete Fourier transform circuit is a clock having a variable output frequency.

3. A circuit as in claim 2 wherein said means for obtaining the propagation direction of the RF signal further comprises:
   separate means coupled to each charge coupled device for converting the separated components of each I and Q signal to a digital format,
   a separate arctangent lookup table coupled to each converting means for using the digital format to provide a corresponding phase angle, $\theta$ in digital form,
   means coupled to each arctangent lookup table for algebraically summing the digital format phase angles to determine the phase difference, $\Delta\theta$ between the signals received by the two antennae,
   means for dividing the phase difference, $\Delta\theta$, by the frequency of interest, f, to obtain a corresponding time of arrival difference, $\Delta t$,
   means for dividing the antenna separation distance, d, by the speed of light, c, to obtain antenna separation in time units, and
   means for dividing the difference in time of arrival signal, $\Delta t$, by the antenna separation in time units, d/c, and calculating the arcsin of the result to obtain the direction angle, $\phi$ of the incoming RF signal.

4. A circuit for finding the direction of an RF signal received on two antennae separated by known distance comprising:
- an RF signal receiver coupled to each antenna for receiving the antenna signals and generating orthogonal I and Q baseband signal outputs;
- a means for sampling said orthogonal I and Q baseband signal outputs;
- means for varying the sampling rate of said means for sampling;
- means, including a CCD Chirp-Z Discrete Fourier transform circuit, coupled to said means for sampling, for generating real and imaginary coefficients of the Discrete Fourier transform of said sampled baseband signal; and
- means coupled to said transform circuit for utilizing said real and imaginary coefficients to obtain the direction of propagation of the RF signal.

5. A method of finding the direction of an RF signal received on two antennae separated by a known distance "d" comprising the steps of:
- providing orthogonal I and Q baseband signal outputs from an RF receiver coupled to each antenna,
- sampling and separating the I and Q baseband signals into components by frequency and amplitude using a CCD Chip-Z Discrete Fourier transform circuit,
- controlling the sampling rate at which the CCD Chirp-Z Discrete Fourier transform circuit generates the separated I and Q signal components to adjust frequency resolution, and
- calculating the direction in which the RF signal is propagated utilizing the sampled and separated baseband I and Q signal components.

6. A method as in claim 5 wherein the step of sampling and separating said I and Q component signals with said CCD Chirp-Z Discrete Fourier transform circuit further comprises the steps of:
- receiving and sampling the baseband I and Q signals from each RF receiver with a separate CCD Chirp-Z transform discrete fourier transform circuit, and
- separating the components of each I and Q signal by frequency and amplitude said Chirp-Z Discrete Fourier transform circuit with.

7. A method as in claim 6 wherein the step of controlling the sampling rate of the CCD Chirp-Z Discrete Fourier transform further comprises the steps of:
- applying a clock signal to said CCD Chirp-Z Discrete Fourier transform circuit delay line, and
- varying the output frequency of the clock signal to the desired sampling rate.

8. A method as in claim 7 wherein the step of calculating the RF signal propagation direction further comprises the steps of:
- converting the separated components of each I and Q signal from each charge coupled device to a digital format,
- using the digital format from each charge coupled device in an arctangent lookup table to provide a corresponding phase angle, $\theta$, in digital form,
- algebraically summing the digital form phase angles from the arctangent lookup tables to determine the phase difference, $\Delta\theta$ between the signals received by the two antennae,
- dividing the phase difference, $\Delta\theta$, by the frequency, f, to obtain a corresponding time of arrival difference, $\Delta t$,
- dividing the antenna separation distance, d, by the speed of light, c, to obtain antenna separation in time units, and
- dividing the difference in time of arrival signal, $\Delta t$, by the antenna separation, d/c, and calculating the arcsin of the result to obtain the direction angle $\phi$, of the incoming RF signal.

* * * * *